July 3, 1928.  1,676,220
J. H. SEYMOUR ET AL
THRUST BEARING
Filed July 29, 1926   2 Sheets-Sheet 1
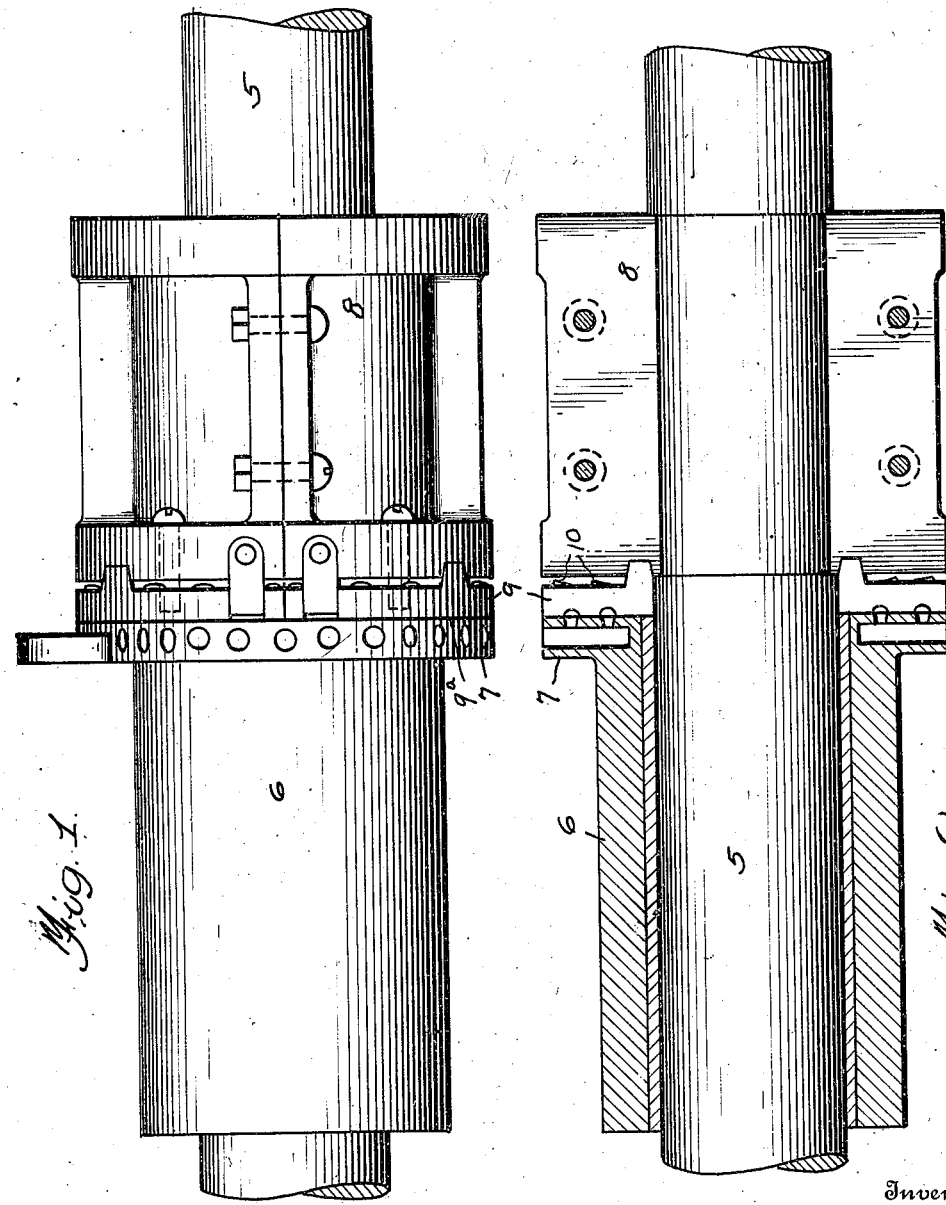
Inventors
J. H. Seymour,
Thomas S. Spear,
By Samuel Herrick
Attorney July 3, 1928. 1,676,220
J. H. SEYMOUR ET AL
THRUST BEARING
Filed July 29, 1926 2 Sheets-Sheet 2

Inventors
J. H. Seymour,
Thomas S. Spear,
By Samuel Hernick,
Attorney

Patented July 3, 1928.

1,676,220

UNITED STATES PATENT OFFICE.

JULIUS H. SEYMOUR AND THOMAS S. SPEAR, OF BARTOW, FLORIDA; SAID SEYMOUR ASSIGNOR TO SAID SPEAR.

THRUST BEARING.

Application filed July 29, 1926. Serial No. 125,693.

This invention relates to thrust bearings of the character of that shown in our copending application Serial Number 120,422, filed on the 3rd day of July, 1926. In that application we have illustrated a thrust bearing having ports extending through and opening at the confronting faces of the wear plates so that oil is delivered directly to the contacting surfaces.

It is the purpose of the present invention to provide a construction of the character described embodying means for utilizing the effects of centrifugal force to cause the oil to travel to the said faces. Further objects and advantages of the invention will be set forth in the detailed description which follows.

In the accompanying drawing

Fig. 1 is a side elevation of a thrust bearing constructed in accordance with the invention.

Fig. 2 is a vertical sectional view therethrough.

Like numerals designate corresponding parts in all of the figures of the drawing.

Figure 3:
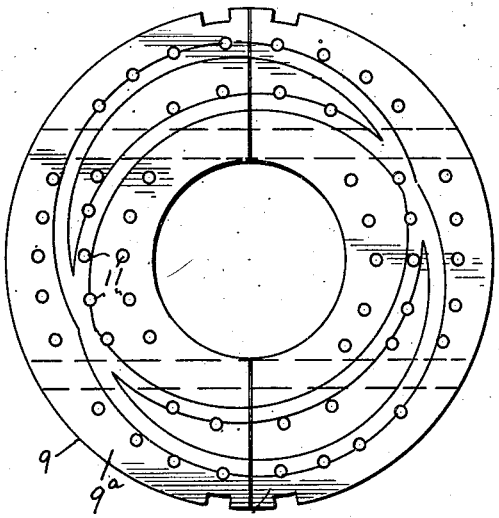
Fig. 3 is a face view of one of the wear plates.
Figure 4:
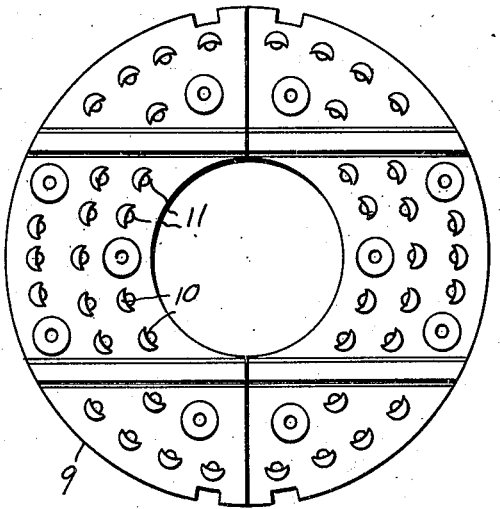
Fig. 4 is a rear elevation of one of the wear plates.
Figure 5:
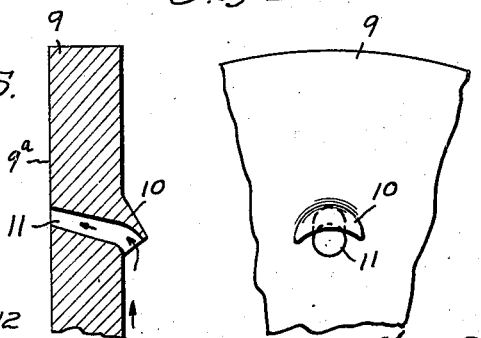
Fig. 5 is a vertical sectional view through one of the ports of the wear plate of Figs. 3 and 4.
Figure 6:
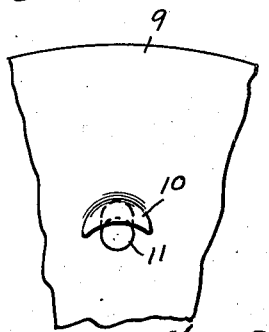
Fig. 6 is a detail view of one of the wear plates hereafter described.

In the drawing, 5 designates a rotative shaft, 6 a fixed bearing element having a thrust collar 7, 8 an abutment fixed to the shaft 5 and rotating therewith, and 9, a wear plate secured to the abutment, but held in spaced relation thereto, the confronting faces of wear collar 7 and wear plate 9 contacting with each other. So far the structure described is like that shown in our copending application. The present invention resides in providing upon the rear face of the wear plate 9, fins or baffles. (See Fig. 5.) These fins are in the form of arcuate hoods and are disposed outwardly of the mouths of the oil ports 11 which lead through the wear plate 9. It is the usual practice to dispose thrust bearings of this character in such relation to an oil bath that the lower part of the structure rotates in the oil bath. Thus a certain amount of oil is picked up and this oil tends to move outwardly, rapidly, under the influence of centrifugal force. The fins are intended to intercept this outwardly moving oil and by their configuration direct it into the ports 11. It will be observed that the ports themselves may be inclined outwardly, so that the tendency of the oil to move outwardly will cause it to travel to the left in Fig. 5 or toward the working face 9ª of wear plate 9.

Figure 7:
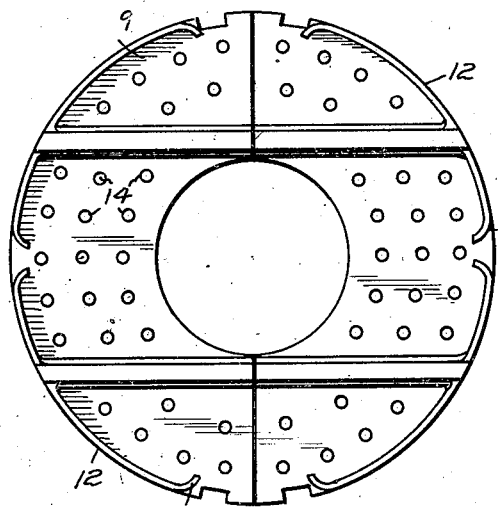
Fig. 7 is a rear view of a modified form of the invention.
Figure 8:
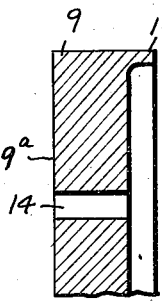
Fig. 8 is a sectional view of the structure of Fig. 7.

In the modified form of the invention illustrated in Figs. 7 and 8, we place fins or webs 12 about the periphery of the wear plate, it being noted that these fins are not continuous, but as indicated at 13, lie in spaced relation to each other so that oil may freely enter the space in the rear of the wear plate. The oil picked up is thrown outwardly by centrifugal force and since the presence of the webs or fins 12 prevents the free escape of the oil, a certain slight pressure is created as the oil banks up against these webs which causes the oil to travel more freely through the oil ports 14, to the face of the wear plate. The building up of pressure as described is brought about by the fact that when the wear plate of Figs. 7 and 8 is secured to the abutment 8 in place of the wear plate 9, the webs 12 constitute a closure about the outer edge of the space, that is formed between the wear plate and the abutment The means for holding the wear plate in spaced relation to the abutment forms no part of the present invention but is included in our prior application above referred to.

Like the wear plate of our prior application the wear plate of the present invention may be made in two semi-circular parts, which facilitates the placing of the parts in position without the necessity of removing the shaft 5 from its bearing.

It is to be understood that the invention is not limited to the precise construction set forth but that it includes within its purview whatever changes fairly come within either the terms or the spirit of the appended claims.

Having described our invention what we claim is:

1. In combination a horizontal shaft and a thrust bearing for the same, comprising an abutment carried by the shaft and rotating therewith, a vertical wear plate spaced from said abutment but connected thereto and rotating therewith and having ports formed therethrough from the rear to the front face thereof and fins carried by said plate at the mouths of the respective ports projecting outwardly beyond the vertical face of the plate to thereby direct oil moving under the influence of centrifugal force into said ports, to cause said oil to travel laterally through the wear plate.

2. A structure as recited in claim 1 wherein said ports are inclined outwardly.

3. The combination with a horizontal shaft and a horizontal bearing for the same, of an abutment carried by and rotating with the shaft and lying in spaced relation thereto, a vertically disposed wear plate secured to and rotating with the abutment and having its working face disposed toward and thrusting against an end of said horizontal bearing, means for holding the vertical wear plate in spaced relation to the abutment, ports passing laterally through the wear plate from the working face thereof to said space and fins carried by said wear plate at the mouths of the respective ports and projecting outwardly beyond the vertical rear face of the wear plate, to thereby direct oil moving under the influence of centrifugal force, into said ports, to cause said oil to travel laterally through the wear plate to the working face thereof.

In testimony whereof we affix our signatures.

JULIUS H. SEYMOUR.
THOMAS S. SPEAR.